April 28, 1970     A. J. MARTENSON     3,508,838
SOUND SUPPRESSION OF COMPRESSORS USED IN GAS TURBINE ENGINES
Filed Sept. 16, 1968
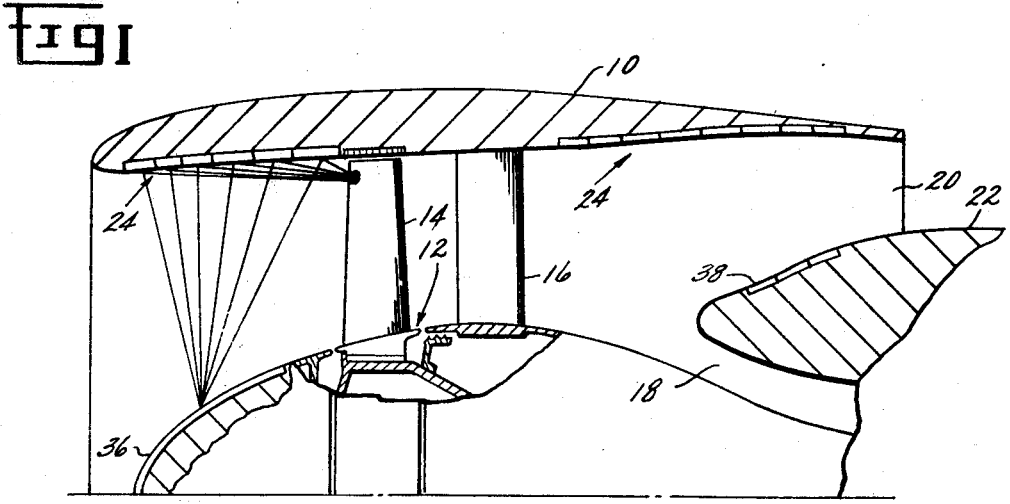
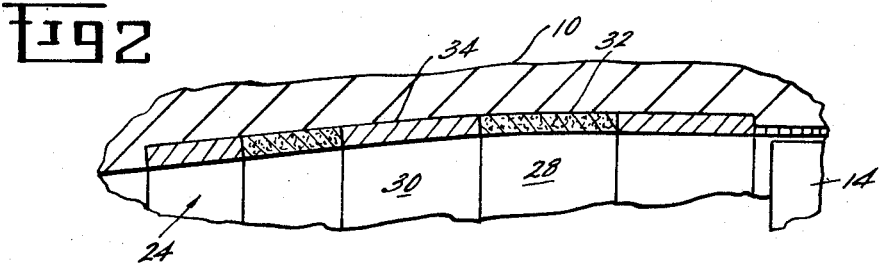
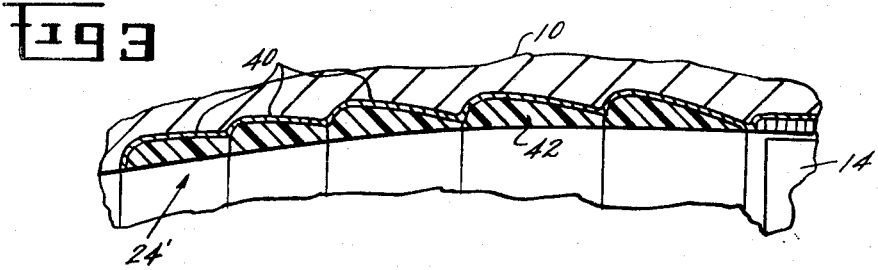
INVENTOR.
ALFRED J. MARTENSON
BY United States Patent Office 3,508,838
Patented Apr. 28, 1970

3,508,838
SOUND SUPPRESSION OF COMPRESSORS USED
IN GAS TURBINE ENGINES
Alfred J. Martenson, Burnt Hills, N.Y., assignor to
General Electric Company, a corporation of New
York
Filed Sept. 16, 1968, Ser. No. 762,266
Int. Cl. E04b 1/99; F04b 39/00
U.S. Cl. 415—19
9 Claims

ABSTRACT OF THE DISCLOSURE

The disclosure shows a gas turbine engine in which focusing means are provided in the fan duct wall to control propagation of sound in a forward and rearward direction.

---

The present invention relates to improvements in gas turbine engines and, more particularly, to improvements in the control of objectionable noise generated in such engines.

The advent of increasingly large aircraft and the great numbers of aircraft now in operation have caused much concern over noise levels which result from low altitude flight, particularly adjacent airports. In the past, the objectionable noise has been primarily generated by discharge of a hot gas stream from a propulsive nozzle. Many aircraft engines today and those scheduled for service in the immediate future derive a major portion of their propulsive force from a high energy fan stream which is pressurized by an axial flow compressor, commonly referred to as a "fan." Fan diameters are relatively large and have high linear tip speeds. As air is pressurized in the fan, objectionable noise is produced primarily at the outer portion of the fan blade.

Techniques previously developed for suppressing the noise levels of a hot gas stream as it is discharged from a propulsive nozzle are not generally appropriate in suppressing noise generated by such fans. Many proposals have been made to suppress, or otherwise control, the noise generated by gas turbine fans, but they have, by and large, had either a minimal effectiveness or have resulted in losses in engine efficiency, usually due to weight penalties. It should be recognized that such fans are axial flow compressors and that similar noise problems can be caused by the compressors of turbojet engines as well.

According, the object of the present invention is to provide improved means for controlling sound generated by compressors, or fans, of gas turbine engines, without the consequent disadvantages of prior proposals for accomplishing such a desired end.

Broadly speaking, the present invention achieves its desired objects by providing means for focusing the sound generated in a compressor duct so that it may be either more effectively absorbed within the duct or its propagation from the duct may be controlled to have a minimal adverse effect when an aircraft is operating in close proximity to populated areas.

The above and other related objects and features of the invention will be apparent from a reading of the following description of the disclosure found in the accompanying drawing and the novelty thereof pointed out in the appended claims.

In the drawing:

FIGURE 1 is a simplified showing off the fan portion of a turbofan engine in which the present invention is embodied;

FIGURE 2 is an enlarged view of a portion of the fan duct wall; and

FIGURE 3 is an enlarged view of a portion of the fan duct wall illustrating another embodiment of the present invention.

FIGURE 1 illustrates the fan portion of a turbofan engine which comprises a cowl 10 within which a fan rotor 12 is housed. The fan rotor has a plurality of radially projecting blades which pressurize air entering the cowl inlet. The pressurized air is turned to an axial flow direction by outlet guide vanes 16. A portion of the pressurized air enters a core engine inlet 18 and supports combustion of fuel in generating a hot gas stream which powers the fan rotor for rotation. The remainder of the air stream is discharged from a propulsive nozzle 20 formed by the downstream end of the cowl 10 and by a nacelle 22 within which the core engine is housed.

The sound field generated by the high speed rotation of the fan blades 14 in pressurizing the air stream is highly complex. Recognizing this fact, for purposes of illustration herein, it will be assumed that the sound is generated from a point source on the outer end of the leading edge of each of the blades 14. In a fan having no suppression whatsoever, the noise generated propagates at relatively wide angles from the fan inlet and from the fan nozzle. The wide angle of propagation is due, at least in part, to the fact that sound reflects from one side of the duct at an angle past the other side. Even with the use of sound suppression material as a liner for the fan duct wall, the angle of propagation is not essentially changed, though its level of intensity may be reduced.

The present invention broadly contemplates the provision of focusing means 24 which will redirect the sound waves in a radially inward direction and preferably away from the adjacent end of the fan duct. By so doing, it is possible to redirect the sound energy so that it is maximum near the engine axis, to reduce the amount and more effectively use sound absorbing material in reducing the power level of sound propagated from the fan.

FIGURE 2 illustrates one form of such a focusing means. The means 24 comprise alternate, circumferential surfaces 28, 30 which are characterized by having different sound reflective properties, recognizing the well-known fact that sound can be reflected from a surface. Due to the different reflective characteristics of these surfaces, there is a phase interrelationship or interaction between reflected sound waves incident thereon and a consequent summation of two incident waves which, in net effect, result in a combined reflected wave having an angle of reflection which can be controlled. The phenomenon described is affected by many parameters and, generally speaking, is uniquely effective on a single frequency of sound. In the case of gas turbine engine compressors and the illustrated fan-type compressors in particular, there is generally a dominant frequency which is the primary source of objectionable noise. Knowing this frequency, it is then possible to size the axial lengths of the surfaces 28 and 30 for effective focusing. To obtain the focusing action described, these lengths should be a fraction of a wave length of the dominant sound frequency to be suppressed.

Angle of incidence is also a factor to be considered and, therefore, the axial lengths of the surfaces 28 and 30 are preferably varied along the length of the duct wall in order to obtain the focusing effect illustrated in FIGURE 1.

The description to this point has dealt with the focusing of sound energy so as to minimize and control its propagation from the engine inlet. The same principles would be employed in forming the focusing means 24 illustrated in FIGURE 1, downstream of the rotating blades 14 at the nozzle. It would also be appreciated that noise can be generated as air is turned by the outlet guide vanes 16 and that the properties of the surfaces of 28 and 30 of such downstream focusing means would be controlled by the frequency and primary source of noise generation, to obtain the same beneficial results described in connection with the focusing means at the inlet end of the duct.

Focusing means in and of themselves can produce highly beneficial results. The ultimates of such focusing means would be to redirect the sound energy so that it does not propagate from the duct but is, instead, attenuated therein. However, because of the complex nature of the noise energy, it is preferable to further include means for suppressing the noise, as well as focusing it. To this end and in further particularity of the description in FIGURE 2, the duct wall may be formed by alternate, circumferential hoops 32, 34. The hoops 32 may be formed of smoothly finished metal, such as aluminum or magnesium, while the hoops 34 may be formed of sound absorbing panels. Sound absorbing panels take many different forms, for example, fibrous types and resonant-chamber types. In any event, the reflective properties of the hoop 34 will be different from the same properties of the hoop 32 and, additionally, will provide a measure of suppression for the sound.

Alternately, or in addition, the focused sound energy may be suppressed by the use of a relatively small amount of sound suppression material at the focal point. Referencing again FIGURE 1, it will be seen that a bullet nose 36, surfaced with suppression material, is provided at the focal point at the inlet end of the fan. Similarly, a circumferential band of suppression material 38 is provided in the nacelle 22 at the focal point of the downstream focusing means 24. Generally speaking, suppression material adds weight. By first focusing the sound energy on a relatively small area, it is possible to obtain effective sound suppression through the use of significantly smaller amounts of sound suppression material.

FIGURE 3 illustrates an alternate focusing means 24'. Again, circumferential elements form the focusing means. In FIGURE 3 these elements take the form of incremental sections, hoops 40 whose surfaces are angled relative to the theoretical point of noise generation so as to focus the sound energy radially inwardly towards a central point or area. Each section 40 is preferably formed as an element of an ellipse so that all angles of reflection therefrom direct the sound energy generally towards a common focal point. In order that the duct wall will be aerodynamically smooth, a sound transparent material 42 surfaces the inner portions of the elliptical sections.

Where the axial length of such elliptical sections is greater than the wave length of the sound energy, there will be reflection of the sound energy in the manner described.

Size considerations may not permit the elliptical sections to be of a length greater than that of the low frequency sound, which may be the dominant factor in a given fan or compressor. In this case the axial lengths of the sections 40 are sized as a desired function of the lower frequency sound wave length. Adjacent sections, due to the different angles involved, have different reflective properties and, therefore, function in the same fashion as described in connection with FIGURE 2 to focus low frequency sound. The elliptical section in a different fashion to focus the high frequency sound. Thus the FIGURE 3 focusing means 24' can be effective in focusing both high frequency and low frequency sound to obtain the benefits described in connection with FIGURE 2.

Many variations of the described embodiments will occur to those skilled in the art, in using the invention in controlling sound in compressor ducts. Such variations will be within the scope of the inventive concepts which are derived from and limited solely by the appended claims.

Having thus described the invention, what is claimed as novel and desired to be secured by Letters Patent of the United States is:

1. A duct, for transmission of a gas stream having sound energy therein and means at one end of the duct for redirecting sound energy, incident thereon, through a wide range of incidence angles, toward a region within the duct, thereby controlling propagation of sound from the duct, said redirecting means comprising serially disposed circumferential duct surfaces each having different sound reflection characteristics.

2. A combination as in claim 1 wherein the duct defines the flow path through an axail flow compressor and a bladed rotor generates noise in the gas station.

3. A combination as in claim 2 wherein the sound redirecting means focus the sound generated at the outer ends of the blades generally towards a common annular line within the axial length of the duct.

4. A combination as in claim 3 wherein sound absorbant material is disposed generally at the annular line of sound focus.

5. A combination as in claim 1 in which the sound has a dominant frequency and the axail length of said serial surfaces are less than the wave length of that frequency.

6. A combination as in claim 1 wherein alternate portions of the duct wall forming said surfaces are formed by sound absorbant material.

7. A combination as in claim 1 wherein the redirecting means comprise incremental angled hoop sections.

8. A combination as in claim 7 wherein the inner surface of said redirecting means is lined with a sound transparent material providing a smooth gas flow path.

9. A combination as in claim 7 wherein there is a predominant low frequency sound and the hoop sections are elliptical and have an axial length less than that of the wave length of the dominant sound frequency whereby the redirecting means will control both low frequency and high frequency sound.

References Cited

UNITED STATES PATENTS

| | | | |
|---|---|---|---|
| 2,720,935 | 10/1955 | Lynsholm et al. | 230—232 |
| 2,801,518 | 8/1957 | Wosika et al. | 181—35.1 |
| 3,077,731 | 2/1963 | Addie et al. | 181—35.1 |
| 2,988,302 | 6/1961 | Smith | 181—33.21 |
| 2,942,683 | 6/1960 | Moyer | 230—232 |
| 2,869,670 | 1/1959 | Huffman | 230—232 |
| 3,402,881 | 9/1968 | Moore et al. | 230—232 |
| 3,221,500 | 12/1965 | Hill | 230—232 |

FOREIGN PATENTS

| | | |
|---|---|---|
| 287,051 | 10/1928 | Great Britain. |
| 811,612 | 4/1959 | Great Britain. |

HENRY F. RADUAZO, Primary Examiner

U.S. Cl. X.R.

137—15.1; 181—33, 35; 230—120